United States Patent [19]

Neil et al.

[11] 4,383,173

[45] May 10, 1983

[54] INFRARED RADIATION DETECTING SYSTEMS

[75] Inventors: Iain A. Neil; Gordon H. McLean; Peter J. Berry, all of Glasgow, Scotland

[73] Assignee: Barr & Stroud Limited, Glasgow, Scotland

[21] Appl. No.: 256,246

[22] Filed: Apr. 21, 1981

[30] Foreign Application Priority Data

Apr. 26, 1980 [GB] United Kingdom ................ 8013850

[51] Int. Cl.³ ......................... H01J 31/49; G01J 1/00; G01B 11/00
[52] U.S. Cl. .................................. 250/330; 250/352; 250/353; 356/397
[58] Field of Search ............... 250/330, 332, 333, 334, 250/338, 342, 352, 353; 356/363, 397, 51; 358/113

[56] References Cited

U.S. PATENT DOCUMENTS

| | | | |
|---|---|---|---|
| 2,431,666 | 11/1947 | Fassin | 356/397 |
| 2,911,879 | 11/1959 | Giwosky | 356/397 |
| 4,018,533 | 4/1977 | Haines | 356/397 |
| 4,150,824 | 4/1979 | Villa | 358/113 |
| 4,205,229 | 5/1980 | Beer | 250/353 |
| 4,315,150 | 2/1982 | Darringer et al. | 250/353 |

*Primary Examiner*—Alfred E. Smith
*Assistant Examiner*—Janice A. Howell
*Attorney, Agent, or Firm*—Mason, Fenwick & Lawrence

[57] ABSTRACT

An infrared radiation detecting system comprises a detector element 13A forming part of a detector 13 incorporating a cold shield 14 and an optical system 12, 15, for imaging infrared radiation from a field of view O onto a real image surface 19 spaced from the detector element 13A and relaying the image I from the surface 19 to the detector element 13A is provided with a graticule 20 having markings which are reflective to infrared radiation emitted by the detector 13. Graticule 20 is located at the image surface 19 so that the graticule markings are imaged onto the detector element 13A in superimposition with the infrared radiation from the field of view O.

7 Claims, 1 Drawing Figure

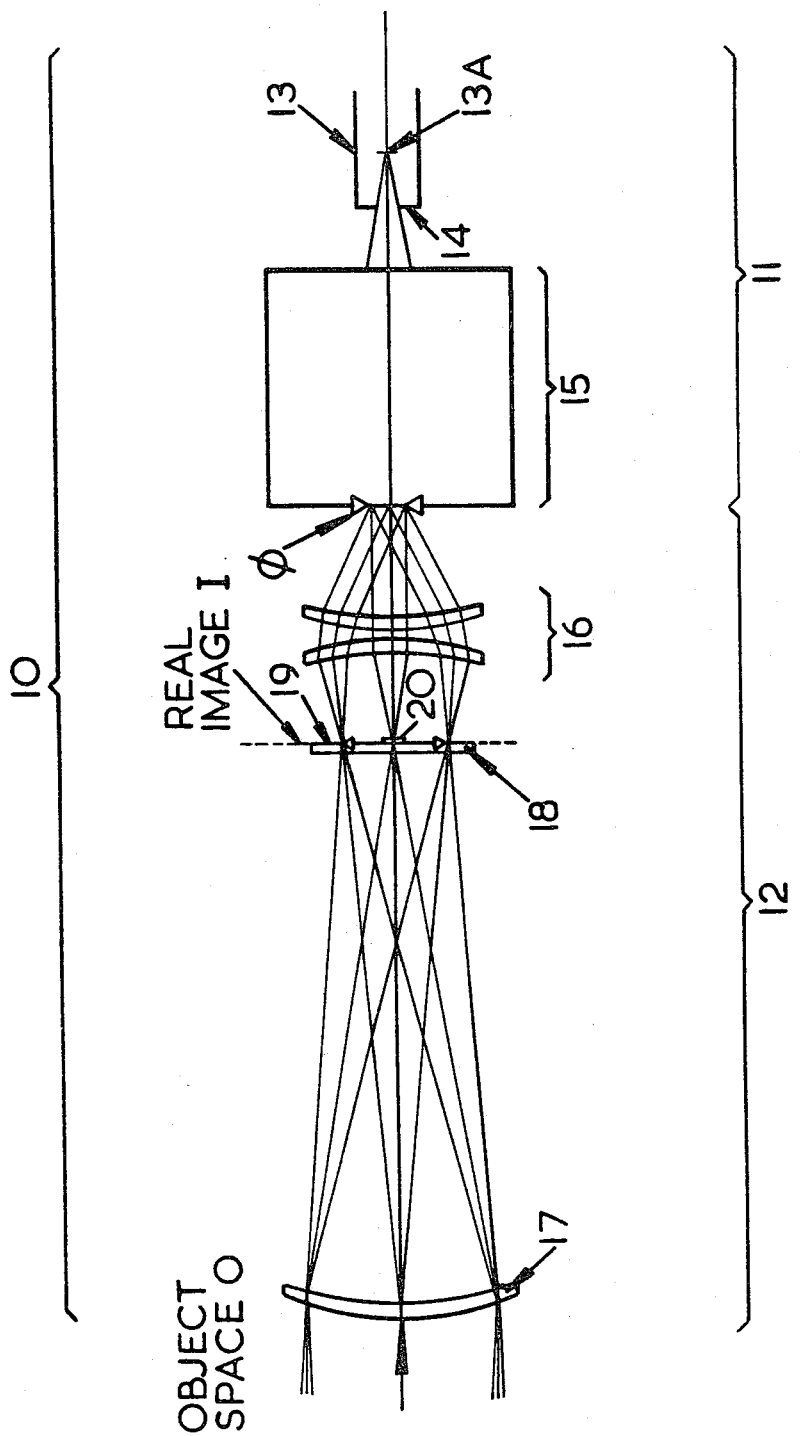

INFRARED RADIATION DETECTING SYSTEMS

This invention relates to infrared radiation detecting systems.

The arrival of high performance "forward looking infrared systems" (commonly known by the acronym FLIR) and high performance afocal telescopes suitable for use with the FLIR system has led to a demand for methods to illuminate optical graticule information injected at a real image within the complete optical system. FLIR system applications which commonly require this feature are for example a tank optical sight where a gun aiming mark, typically in the form of an open or closed cross, or a gun alignment reference system, typically in the form of reference marks around the edge of the field, are each superimposed on the image of the scene.

Various forms of graticule illumination have been previously proposed but the practical requirement for a passive method has imposed the restriction of an electrically heated wire elements and no mechanically movable components.

According to the present invention there is provided an infrared radiation detecting system comprising an infrared detector element forming part of a detector incorporating a cold shield, and an optical system for imaging infrared radiation from a field of view onto a real image surface spaced from the detector element and relaying said image from said surface to said detector element, wherein a graticule having markings which are reflective to infrared radiation emitted by the detector is located at said image surface whereby the graticule markings are imaged onto the detector element in superimposition with the I.R. radiation from the field of view.

Because the graticule mark illumination of the present invention is passive and, at a real image surface, it requires only the introduction of a suitable substrate upon which the graticule marks may be fabricated, it is optically and mechanically simple; with the detector radiation being relatively cold with respect to typical radiation from the scene there will almost always be contrast between the superimposed scene and graticule mark images and because it is easy to provide the required radiometry for the reflection from a graticule mark anywhere within the field of view at a real image this readily enables the injection of any number of graticule marks. The substrate which supports the graticule marks may be a positive, negative or zero power optical element or it may be a chemically milled component. The graticule marks which may be placed on the substrate or even be a part of the substrate are preferably composed of any material which can provide an acceptable level of reflectivity. Ideally the real image surface chosen for injection of the graticule marks should provide near diffraction limited optical performance. However, depending on the size and shape of the graticule marks some degradation of optical performance may be tolerated. Under certain thermal scene conditions losses in contrast between the scene and graticule images may occur. One method employed to eradicate this problem involves the graticule marks themselves being fabricated from two or more materials having substantially different reflectivity characteristics. To minimise defocus effects caused by ambient temperature variations it is preferable that the graticule marks are placed at a real image surface which is insensitive to moderate ambient temperature variations.

Depending upon the design of the optical system there may exist a plurality of real image surfaces at which graticules could be inserted in accordance with the present invention. Thus where the optical system comprises a telescope and a scanner and two real image surfaces are formed one graticule can be inserted at each such image surface and in addition to providing useful markings superimposed upon the scene image provide a means of identifying relative misalignment of the telescope and scanner.

An embodiment of the present invention will now be described by way of example with reference to the accompanying schematic drawing.

As is shown in the drawing an optical system 10 is formed by a FLIR system 11 and a telescope system 12. The FLIR system 11 comprises a detector element 13A forming part of a detector 13 cooled to (a temperature of approximately) 77 Kelvin by liquid air, an aperture stop 14, commonly known as a cold shield, which is at a closely similar temperature (e.g. 80° K.) to that of the detector 13, and a scanning system 15 which over a given field of view accepts radiation from a pupil $\emptyset$ and provides scanned images at the detector element 13A so as to produce a two-dimensional image. The telescope 12 is of the afocal refractor type and internally forms a real image I and an exit pupil $\emptyset$ of radiation entering the telescope from object shape 0. The telescope 12 comprises an eyepiece lens 16 and an objective lens 17 and forms a real image I which lies on surface 19. The graticule mark 20 is in the form of a chrome deposition lying in refractive surface 19 and supported by a plane-parallel plate 18. The optical system 10 is designed for use in the 8–13 micron infrared wavelength region. Because only the chorme coated graticule mark 20 substantially reflects the radiation emitted from the detector 13 and because this reflected radiation forms a real image at the detector element 13A, a narcissus image of the cooled components of the detector 13 (including the detector element 13A, surrounding substrate and aperture stop 14) is formed, the shape of which is determined by the shape of the chrome coated graticule mark 20. Since the radiation emitted from object space 0 passes through that aperture area at the real image surface I which is not chrome coated the detector element 13A sees a superimposed image of the scene in object space 0 and the graticule mark 20.

The thermal contrast between the superimposed images is produced by the temperature difference between the graticule image and the scene image at the detector element 13A, the graticule image being formed by radiation which originates at the detector 13 and which is relatively cold compared to that radiation which originates in object space 0 and forms the scene image.

In this example the detector 13 is cooled to a temperature of approximately 77 Kelvin whilst the scene contains objects which emit radiation typically within the temperature range 230–340 Kelvin. The plane parallel plate 18 is composed of Zinc Selenide material which has low material inhomogeneities and does not significantly degrade the overall optical performance of the optical system 10.

It will be understood that in this example surface 19 is planar but for a different form of telescope 12 surface 19 could be curved and could be coincident with a refractive surface of the eyepiece lens 16 and in either event graticule mark 20 could be supported on a substrate with optical power. Additionally, the substrate need not be optically-transmitting material, for example, mark 20 could be supported by a web-like (chemically milled) structure. The substrate or support structure may or may not fill the field of view at the image surface I and of course mark 20 need not be axially located but could take the form of an annulus peripherally bounding the field of view. The mark 20 may also be located above, below or between any number of anti-reflective coatings over the graticule substrate.

For the purpose of determining alignment or misalignment between the telescope 12 and the scanner 15 a further graticule could be inserted in the scanner 15 at a real image formed therein and a comparison could be made at the detector element of the match or mismatch of information contained on the two graticules. Of course, each graticule could itself be formed by an overlay of different markings all located at the one image surface I.

What is claimed is:

1. An infrared radiation detecting system comprising an infrared detector element forming part of a detector incorporating a cold shield, and an optical system for imaging infrared radiation from a field of view onto a real image surface spaced from the detector element and relaying said image from said surface to said detector element, wherein a graticule having markings which are reflective to infrared radiation emitted by the detector is located at said image surface whereby the graticule markings are imaged onto the detector element in superimposition with the infrared radiation from the field of view.

2. A system as claimed in claim 1, wherein the graticule is supported on a substrate which is itself an optical element of said optical system.

3. A system as claimed in claim 2, wherein said substrate has a planar surface containing said graticule.

4. A system as claimed in claim 1, wherein the graticule is chemically milled on a substrate.

5. A system as claimed in claim 1, wherein said optical system provides diffraction-limited optical performance at the image surface at which the graticule is located.

6. A system as claimed in claim 1, wherein said graticule is made from a plurality of materials having substantially different reflectivity characteristics to provide graticule contrast with the field of view over a wide range of thermal scene conditions.

7. A system as claimed in claim 1, wherein said optical system images said field of view radiation onto a second real image surface, and comprising a second graticule having markings which are reflective to infrared radiation emitted by the detector and located at said second real image surface whereby the markings of said second graticule are imaged onto the detector element and misalignment of components within said optical system is monitored according to the relative position of the two graticule markings as detected by said detector element.

* * * * *